(12) United States Patent
Reinhardt et al.

(10) Patent No.: US 7,373,548 B2
(45) Date of Patent: May 13, 2008

(54) HARDWARE RECOVERY IN A MULTI-THREADED ARCHITECTURE

(75) Inventors: Steven K. Reinhardt, Vancouver, WA (US); Shubhendu S. Mukherjee, Framingham, MA (US); Joel S. Emer, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 586 days.

(21) Appl. No.: 10/651,523

(22) Filed: Aug. 29, 2003

(65) Prior Publication Data

US 2005/0050386 A1 Mar. 3, 2005

(51) Int. Cl.
*G06F 11/00* (2006.01)

(52) U.S. Cl. .......................................... 714/13; 714/15

(58) Field of Classification Search .................. 714/15, 714/38, 13, 2, 16, 37; 712/218
See application file for complete search history.

(56) References Cited

U.S. PATENT DOCUMENTS

| | | | | |
|---|---|---|---|---|
| 5,938,775 | A | * | 8/1999 | Damani et al. ................ 714/15 |
| 6,023,772 | A | * | 2/2000 | Fleming ...................... 714/13 |
| 6,052,808 | A | | 4/2000 | Wu et al. |
| 6,058,491 | A | * | 5/2000 | Bossen et al. ................ 714/15 |
| 6,317,821 | B1 | | 11/2001 | Batten et al. |
| 6,326,809 | B1 | | 12/2001 | Gambles et al. |
| 6,519,730 | B1 | * | 2/2003 | Ando et al. ................ 714/746 |
| 6,598,122 | B2 | * | 7/2003 | Mukherjee et al. ......... 711/126 |
| 2001/0034854 | A1 | * | 10/2001 | Mukherjee ....................... 714/5 |

OTHER PUBLICATIONS

Kasbekar, M. Narayanan, c. Das, C.R. ; Selective checkpointing and rollbacks in multi-threaded object-oriented environment; Dec. 1999; IEEE, ISSN: 0018-9529; vol. 48, Issue:4, pp. 325-337.*

Shah, V. Bhattachaya, S. ; Fault propagation analysis based variable length checkpoint placement for fault-tolerant parallel and distributed systems; Aug. 13-15, 1997; IEEE, INSPEC Accession No. 5698225; pp. 612-615.*

Haitham Akkary, Micheal A. Driscoll, "A Dynamic Multithreading Processor," Proceedings of the 31st Annual International Symposium on Microarchitecture, Nov. 30-Dec. 2, 1998, pp. 1-11, Dallas, Texas, USA.

Seon Wook Kim, et al., "Reference Idempotency Analysis: A Framework for Optimizing Speculative Execution," Proceedings of the SIGPLAN Symposium on Principals and Practice of Parallel Programming (PPoPP), Jun. 18-20, 2001, pp. 1-10, Snowbird, Utah, USA.

(Continued)

*Primary Examiner*—Dieu-Minh Le
(74) *Attorney, Agent, or Firm*—Blakely, Sokoloff, Taylor & Zafman LLP

(57) ABSTRACT

Log-based hardware recovery. A checkpointed state of a system includes both architectural register values and memory. The checkpoint consists of a copy of the architectural register file values at the time the checkpoint is generated. An ordered log of non-deterministic events is maintained so that the responses can be repeated to simulate a complete checkpoint for error recovery purposes. When a processor detects an error, the processor reloads the state from the last checkpoint and repeats the non-deterministic events from the log.

27 Claims, 9 Drawing Sheets

OTHER PUBLICATIONS

Deborah T. Marr, et al., "Hyper-Threading Technology Architecture and Microarchitecture," Intel Technology Journal Q1, 2002, pp. 1-12.

Shubhendu S. Mukherjee, et al., "Detailed Design and Evaluation of Redundant Multithreading Alternatives," 29th Annual International Symposium on Computer Architecture (ISCA), 2002, pp. 1-12.

Steven K. Reinhardt, Shubhendu S. Mukherjee, "Transient Fault Detection via Simultaneous Multithreading," 27th Annual International Symposium on Computer Architecture, Jun. 2000, pp. 1-12.

Notice of Allowance for 10/651,388 (42P15453) mailed Aug. 16, 2007, 6 pgs.

* cited by examiner

HARDWARE RECOVERY IN A MULTI-THREADED ARCHITECTURE

RELATED APPLICATIONS

This U.S. Patent application is related to the following U.S. Patent applications:

(1) INCREMENTAL CHECKPOINTING IN A MULTI-THREADED ARCHITECTURE, application number 10/651,376, filed Aug. 29, 2003; and (2) PERIODIC CHECKPOINTING IN A REDUNDANTLY MULTI-THREADED ARCHITECTURE, application number 10/651,388, filed Aug. 29, 2003.

TECHNICAL FIELD

The invention relates to multi-threaded computing architectures. More specifically, the invention relates to devices and techniques for hardware error recovery in a multi-threaded computing architecture.

BACKGROUND

Processors are becoming increasingly vulnerable to transient faults caused by alpha particle and cosmic ray strikes. These faults may lead to operational errors referred to as "soft" errors because these errors do not result in permanent malfunction of the processor. Strikes by cosmic ray particles, such as neutrons, are particularly critical because of the absence of practical protection for the processor. Transient faults currently account for over 90% of faults in processor-based devices.

As transistors shrink in size the individual transistors become less vulnerable to cosmic ray strikes. However, decreasing voltage levels that accompany decreasing transistor sizes and the corresponding increase in transistor count results in an exponential increase in overall processor susceptibility to cosmic ray strikes or other causes of soft errors. To compound the problem, achieving a selected failure rate for a multi-processor system requires an even lower failure rate for the individual processors. As a result of these trends, fault detection and recovery techniques, typically reserved for mission-critical applications, are becoming increasing applicable to other processor applications.

Several terms are commonly used when discussing processor errors and error recovery. A Failure in Time (FIT) refers to an error rate of one failure in one billion ($10^9$) hours. Mean Time Between Failure (MTBF) is the time between failures caused by soft errors. MTBF requirements are typically expressed in years. For example, one FIT equals a MTBF of 114,155 years:

$$114,155 = \frac{10^9}{(24*365)}.$$

Silent Data Corruption (SDC) occurs when errors are not detected and may result in corrupted data values that can persist until the processor is reset. The SDC Rate is the rate at which SDC events occur. Detected, unrecoverable errors (DUE) are errors that are detected, for example, by using parity checking, but cannot be corrected. The rate of these errors is referred to as the DUE rate.

For example, publicly available documents from IBM (D.C. Bossen, "CMOS Soft Errors and Server Design," IBM Server Group, Reliability Physics Tutorial Notes, Reliability Fundamentals, April 2002.), specify 25 years MTBF for DUE and 1000 years MTBF for SDC. These specifications are for single-processor systems. Application to a multi-processor system results in more stringent specifications for individual processors. It is becoming increasingly difficult to meet SDC and DUE FIT specifications because the neutron FIT contribution of latches is increasing. Other components, for example, most SRAM cells, either can be protected via interleaved parity or error correcting codes or do not provide significant contribution to the overall FIT rate.

The FIT rate of latches consists of two parts: the raw FIT rate and a derating factor. The raw FIT rate can be computed using circuit models and currently ranges between 0.001 and 0.01 per latch. The derating factor is the fraction of faults that lead to errors. Typically, the derating factor is 10%. See, for example, Eugene Normand, "Single Event Upset at Ground Level," IEEE Transactions on Nuclear Science, Vol. 43, No. 6, December 1996 and Y. Tosaka, et al., "Impact of Cosmic Ray Neutron Induced Soft Errors on Advanced Submicron CMOS Circuits," VLSI Symposium on VLSI Technology Digest of Technical Papers, 1996. Using the specifications set forth above as a further example, in a 64-processor system, each processor can have only approximately 1,800 latches. However, designing a complex, high-performance processor core with only 1,800 latches is extremely difficult.

Fault detection support can reduce a processor's SDC rate by halting computation before faults can propagate to permanent storage. Parity, for example, is a well-known fault detection mechanism that avoids silent data corruption for single-bit errors in memory structures. Unfortunately, adding parity to latches or logic in high-performance processors can adversely affect the cycle time and overall performance. Consequently, processor designers have resorted to redundant execution mechanisms to detect faults in processors.

Current redundant-execution systems commonly employ a technique known as "lockstepping" that detects processor faults by running identical copies of the same program on two identical lockstepped (cycle-synchronized) processors. In each cycle, both processors are fed identical inputs and a checker circuit compares the outputs. On an output mismatch, the checker flags an error and can initiate a recovery sequence. Lockstepping can reduce a processor's SDC FIT by detecting each fault that manifests at the checker. Unfortunately, lockstepping wastes processor resources that could otherwise be used to improve performance.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Methods and apparatuses for hardware recovery in a multithreaded architecture are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

In one embodiment, a redundant multithreaded (RMT) system provides fault detection in a more efficient manner than traditional techniques such as lockstepping. The RMT processor detects hardware faults by running corresponding copies of the same thread with identical inputs and comparing the outputs for mismatches. By making the domain of checking the processor, the outputs of the processors, for example, memory writes (address and data) are checked.

Transparent hardware recovery requires a fault-free checkpointed state of the system so that on an error the processor can reload the fault-free state and repeat execution. In one embodiment, the checkpointed state of a system includes both architectural register values and memory. The checkpoint consists of a copy of the architectural register file values at the time the checkpoint is generated. In one embodiment, checkpointing also includes an ordered log of responses from memory so that the responses can be repeated to simulate a complete checkpoint of the memory.

Described in greater detail below are techniques for periodic checkpointing of the architectural register file and logs of external (to the processors) inputs, such as load values, to allow transparent recovery from an error. When a processor detects an error on a store instruction (e.g., via an output comparison mechanism), the processor reloads the state from the last checkpoint, repeats the external inputs from the log, but suppresses outputs to memory because those outputs have been previously committed. In one embodiment, this technique uses a log of external inputs to decouple the committing of output values from register checkpointing, allowing higher performance and uses input replication mechanisms to serve as the log of external inputs.

Sphere of Replication

Figure 1:
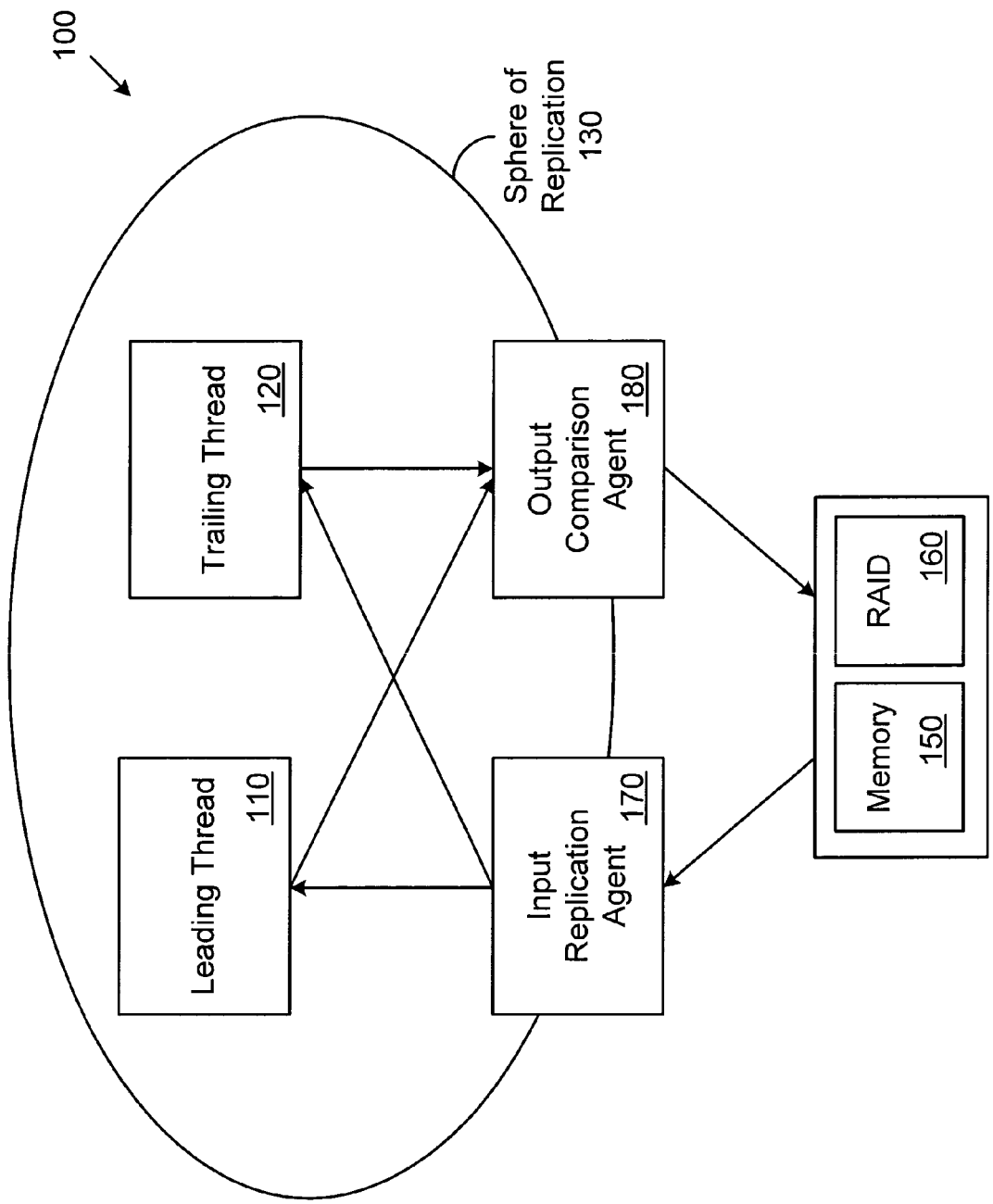
FIG. 1 is a block diagram of one embodiment of a redundantly multithreaded architecture.

FIG. 1 is a block diagram of one embodiment of a redundantly multithreaded architecture. In a redundantly multithreaded architecture faults can be detected by executing two copies of a program as separate threads. Each thread is provided with identical inputs and the outputs are compared to determined whether an error has occurred. Redundant multithreading can be described with respect to a concept referred to herein as the "sphere of replication." The sphere of replication is the boundary of logically or physically redundant operation.

Components within sphere of replication 130 (e.g., a processor executing leading thread 110 and a processor executing trailing thread 120) are subject to redundant execution. In contrast, components outside sphere of replication 130 (e.g., memory 150, RAID 160) are not subject to redundant execution. Fault protection is provide by other techniques, for example, error correcting code for memory 150 and parity for RAID 160. Other devices can be outside of sphere of replication 130 and/or other techniques can be used to provide fault protection for devices outside of sphere of replication 130.

Data entering sphere of replication 130 enter through input replication agent 170 that replicates the data and sends a copy of the data to leading thread 110 and to trailing thread 120. Similarly, data exiting sphere of replication 130 exit through output comparison agent 180 that compares the data and determines whether an error has occurred. Varying the boundary of sphere of replication 130 results in a performance versus amount of hardware tradeoff. For example, replicating memory 150 would allow faster access to memory by avoiding output comparison of store instructions, but would increase system cost by doubling the amount of memory in the system.

In general, there are two spheres of replication, which can be referred to as "SoR-register" and "SoR-cache." In the SoR-register architecture, the register file and caches are outside the sphere of replication. Outputs from the SoR-register sphere of replication include register writes and store address and data, which are compared for faults. In the SoR-cache architecture, the instruction and data caches are outside the sphere of replication, so all store addresses and data, but not register writes, are compared for faults.

The SoR-cache architecture has the advantage that only stores (and possibly a limited number of other selected instructions) are compared for faults, which reduces checker bandwidth and improves performance by not delaying the store operations. In contrast, the SoR-register architecture requires comparing most instructions for faults, which requires greater checker bandwidth and can delay store operations until the checker determines that all instructions prior to the store operation are fault-free. The SoR-cache can provide the same level of transient fault coverage as SoR-register because faults that do not manifest as errors at the boundary of the sphere of replication do not corrupt the system state, and therefore, are effectively masked.

In order to provide fault recovery, each instruction result should be compared to provide a checkpoint corresponding to every instruction. Accordingly, the SoR-register architecture is described in greater detail herein.

Overview of Simultaneous and Redundantly Threaded Architecture

Figure 2:
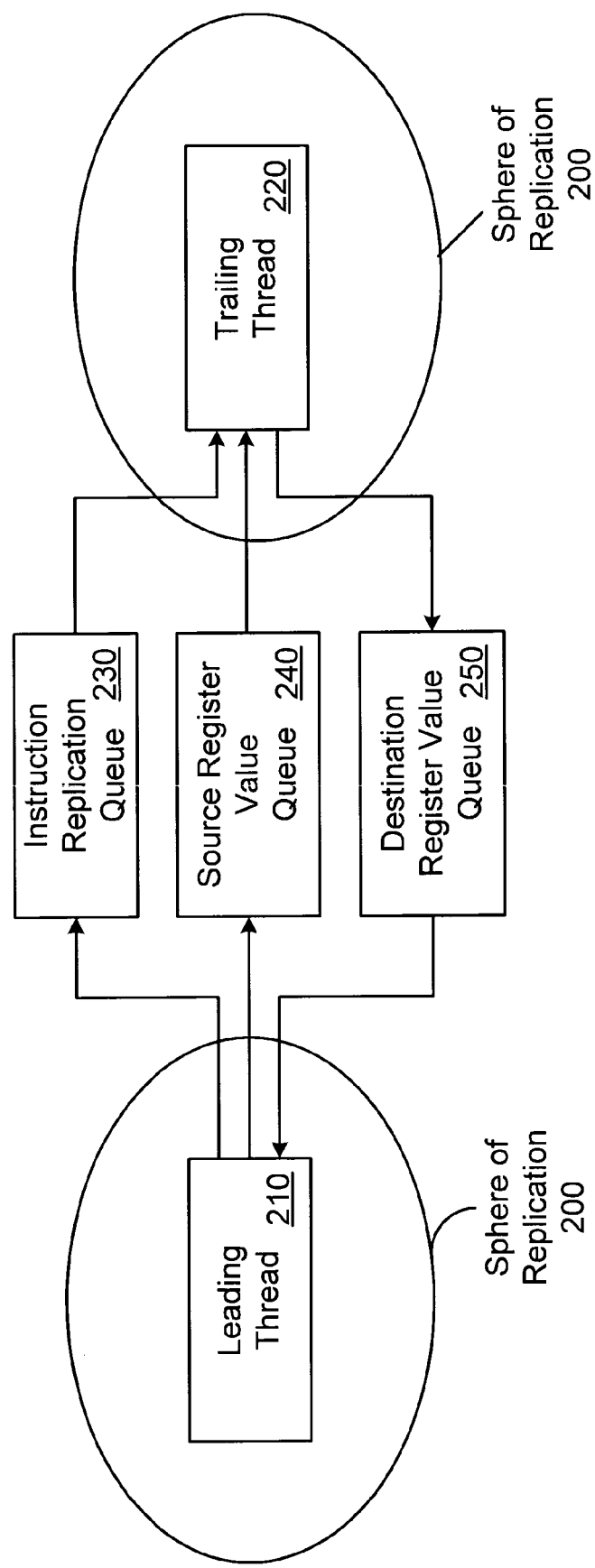
FIG. 2 is a block diagram of one embodiment of a simultaneous and redundantly threaded architecture.

FIG. 2 is a block diagram of one embodiment of a simultaneous and redundantly threaded architecture. The architecture of FIG. 2 is a SoR-register architecture in which the output, or result, from each instruction is compared to detect errors.

Leading thread 210 and trailing thread 220 represent corresponding threads that are executed with a time differential so that leading thread 210 executes instructions before trailing thread 220 executes the same instruction. In one embodiment, leading thread 210 and trailing thread 220 are identical. Alternatively, leading thread 210 and/or trailing thread 220 can include control or other information that is not included in the counterpart thread. Leading thread 210 and trailing thread 220 can be executed by the same processor or leading thread 210 and trailing thread 220 can be executed by different processors.

Instruction addresses are passed from leading thread 210 to trailing thread 220 via instruction replication queue 230. Passing the instructions through instruction replication queue 230 allows control over the time differential or "slack" between execution of an instruction in leading thread 210 and execution of the same instruction in trailing thread 220.

Input data are passed from leading thread 210 to trailing thread 220 through source register value queue 240. In one embodiment, source register value queue 240 replicates input data for both leading thread 210 and trailing thread 220. Output data are passed from trailing thread 220 to leading thread 210 through destination register value queue 250. In one embodiment, destination register value queue 250 compares output data from both leading thread 210 and trailing thread 220.

In one embodiment, leading thread 210 runs hundreds of instructions ahead of trailing thread 220. Any number of instructions of "slack" can be used. In one embodiment, the slack is caused by slowing and/or delaying the instruction fetch of trailing thread 220. In an alternate embodiment, the slack can be caused by instruction replication queue 230 or an instruction replication mechanism, if instruction replication is not performed by instruction replication queue 230.

Further details for techniques for causing slack in a simultaneous and redundantly threaded architecture can be found in "Detailed Design and Evaluation of Redundant Multithreading Alternatives," by Shubhendu S. Mukherjee, Michael Kontz and Steven K. Reinhardt in *Proc. 29th Int'l Symp. on Computer Architecture*, May 2002 and in "Transient Fault Detection via Simultaneous Multithreading," by Steven K. Reinhardt and Shubhendu S. Mukherjee, in *Proc. 27th Int'l Symp. on Computer Architecture*, June 2000.

Overview of Chip-Level Redundantly Threaded Architecture

Figure 3:
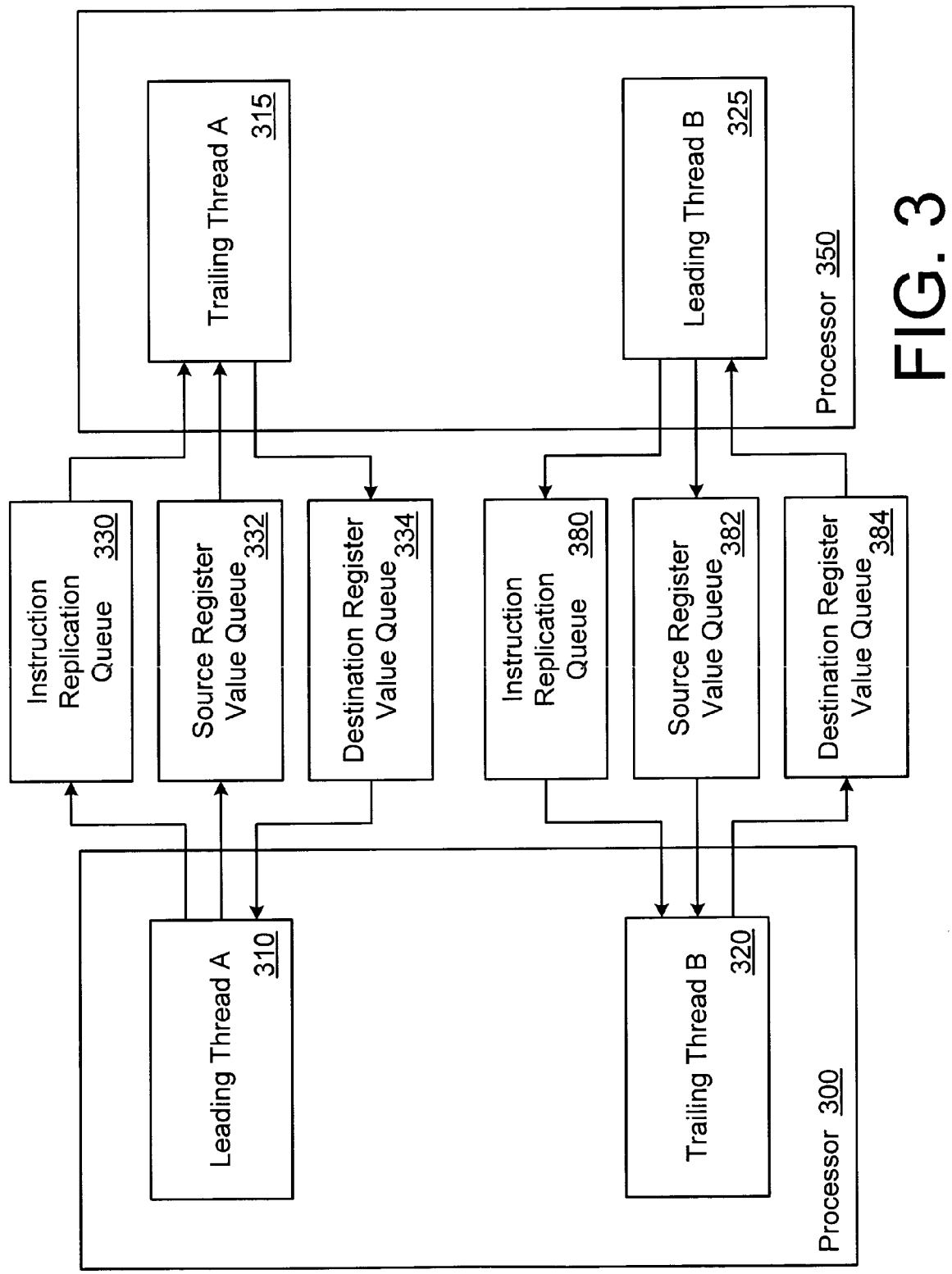
FIG. 3 is a block diagram of one embodiment of a chip-level redundantly threaded architecture.

FIG. 3 is a block diagram of one embodiment of a chip-level redundantly threaded (CRT) architecture. As with the SRT architecture described above, the CRT architecture executes loosely synchronized redundant threads, which enable lower checker overhead and reduces or eliminates cache miss and misspeculation penalties in the trailing thread. As in lockstepping, the two redundant thread copies execute on separate processor cores. That is, the two redundant threads are not multiplexed as different thread contexts on a single processor core as in the SRT architecture. This allows the CRT architecture to provide the same transient and permanent fault protection as lockstepping.

Leading thread 310 executed by processor 300 and trailing thread 315 executed by processor 350 represent a first set of corresponding threads (Thread A) that are executed with a time differential so that leading thread 310 executes instructions before trailing thread 315 executes the corresponding instruction. Similarly, leading thread 325 executed by processor 350 and trailing thread 320 executed by processor 300 represent a second set of corresponding threads (Thread B) that are executed with a time differential so that leading thread 325 executes instructions before trailing thread 320 executes the corresponding instruction.

Instructions to be executed by trailing thread 315 are passed from leading thread 310 to trailing thread 315 through instruction replication queue 330. Input data are passed from leading thread 310 executed by processor 300 to trailing thread 315 executed by processor 350 through source register value queue 332. In one embodiment, source register value queue 332 replicates input data for both leading thread 310 and trailing thread 315. Output data are passed from trailing thread 315 to leading thread 310 through destination register value queue 334. In one embodiment, destination register value queue 334 compares output data from both leading thread 310 and trailing thread 315.

Instructions to be executed by trailing thread 320 are passed from leading thread 325 to trailing thread 320 through instruction replication queue 380. Input data are passed from leading thread 325 executed by processor 350 to trailing thread 320 executed by processor 300 through source register value queue 382. In one embodiment, source register value queue 382 replicates input data for both leading thread 325 and trailing thread 320. Output data are passed from trailing thread 320 to leading thread 320 through destination register value queue 384. In one embodiment, destination register value queue 384 compares output data from both leading thread 320 and trailing thread 325.

Instruction queues 330 and 380, source register value queues 332 and 382, and destination register queues 334 and 384 are illustrated as outside of processors 300 and 350 to indicate the independent nature of physical queue placement. The queues illustrated in FIG. 3 can be implemented in processor 300, in processor 350 or in both processor 300 and processor 350.

When executing single-thread workloads, the CRT architecture performs similarly to lockstepping because the behavior of the leading thread is similar to that of the individual thread in a lockstepped processor. However, with multithreaded workloads, the CRT architecture "cross-couples" the processor cores to increase efficiency and provide improved performance as compared to lockstepping. For example, with two application threads, each core runs the leading thread for one application and the trailing thread for the other application. The resources freed by the CRT architecture on each core from optimizing execution of the trailing thread are then available for the more resource-intensive leading thread execution.

Figure 4:
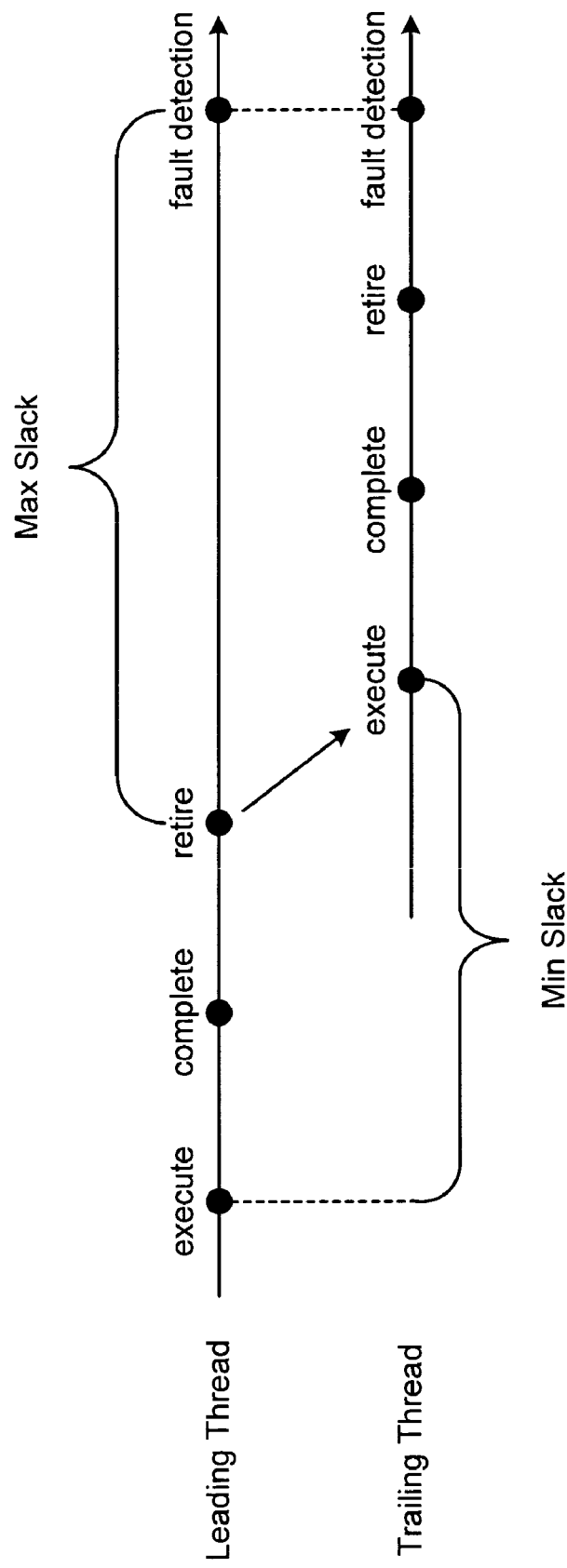
FIG. 4 illustrates minimum and maximum slack relationships for one embodiment of a simultaneous and redundantly threaded architecture.

FIG. 4 illustrates minimum and maximum slack relationships for one embodiment of a simultaneous and redundantly threaded architecture. The embodiment of FIG. 4 is a SoR-register architecture as described above. The minimum slack is the total latency of a cache miss, latency from execute to retire, and latency incurred to forward the load address and value to the trailing thread. If the leading thread suffers a cache miss and the corresponding load from the trailing thread arrives at the execution point before the minimum slack, the trailing thread is stalled.

Similarly, the maximum slack is latency from retire to fault detection in the leading thread. In general, there is a certain amount of buffering to allow retired instructions from the leading thread to remain in the processor after retirement. This defines the maximum slack between the leading and trailing threads. If the buffer fills, the leading thread is stalled to allow the trailing thread to consume additional instructions from the buffer. Thus, if the slack between the two threads is greater than the maximum slack, the overall performance is degraded.

Overview of Checkpointing and Backward Recovery

One fault-recovery technique, referred to as "backward recovery", involves restoring a system (e.g., a processor, a computer system) to an earlier fault-free state and re-executing a thread from the restoration point. A copy of the earlier state that can be restored is referred to as a "checkpoint." Backward recovery includes two issues to be addressed to provide transparent recovery: non-deterministic events and regenerated outputs.

If a non-deterministic event (e.g., an asynchronous interrupt) occurs after the last checkpoint re-execution after a fault may not follow the same path as the original execution. Specifically, if an externally visible output (e.g., a store) was generated along the original execution path prior to the fault, but the re-execution follows a different path that generates a different output, the resulting sequence of outputs, as observed from a reference external to the system, will not be consistent with fault-free execution and recovery will not be transparent. To prevent this occurrence, a backward recovery system must guarantee at each output operation that any subsequent fault-induced rollback will follow the same execution path up to the point of the output. This is referred to as the "output commit" problem.

Even if the re-execution deterministically follows the same path as the original execution, any externally visible output operations after the last checkpoint will be performed again during re-execution. If these output operations are not idempotent, then the re-execution will lead to behavior inconsistent with a fault-free execution and recovery will not be transparent.

One solution to both issues (non-deterministic events and regenerated outputs) is to create a new checkpoint automatically with each output operation. The checkpoint then incorporates any non-deterministic events that may have led to the execution of that output operation. If the output operation completes successfully, then any subsequent fault will roll back to the execution point after that operation and the output operation will not be re-executed.

Overview of Log-Based Recovery

In general, log-based recovery decouples the fault detection point from the checkpoint validation. This decoupling allows a performance advantage of the RMT architecture while also providing transparent hardware recovery that improves the SER FIT of a processor.

Log-based recovery applies to a system that is piecewise deterministic (i.e., a system in which execution consists of deterministic intervals separated by non-deterministic events). An event is considered non-deterministic if execution of the event is not determined entirely by the state inside the system. The state of a piecewise deterministic system at any point can be recreated given an initial condition and a complete description of all non-deterministic events up to the desired point.

Figure 5:
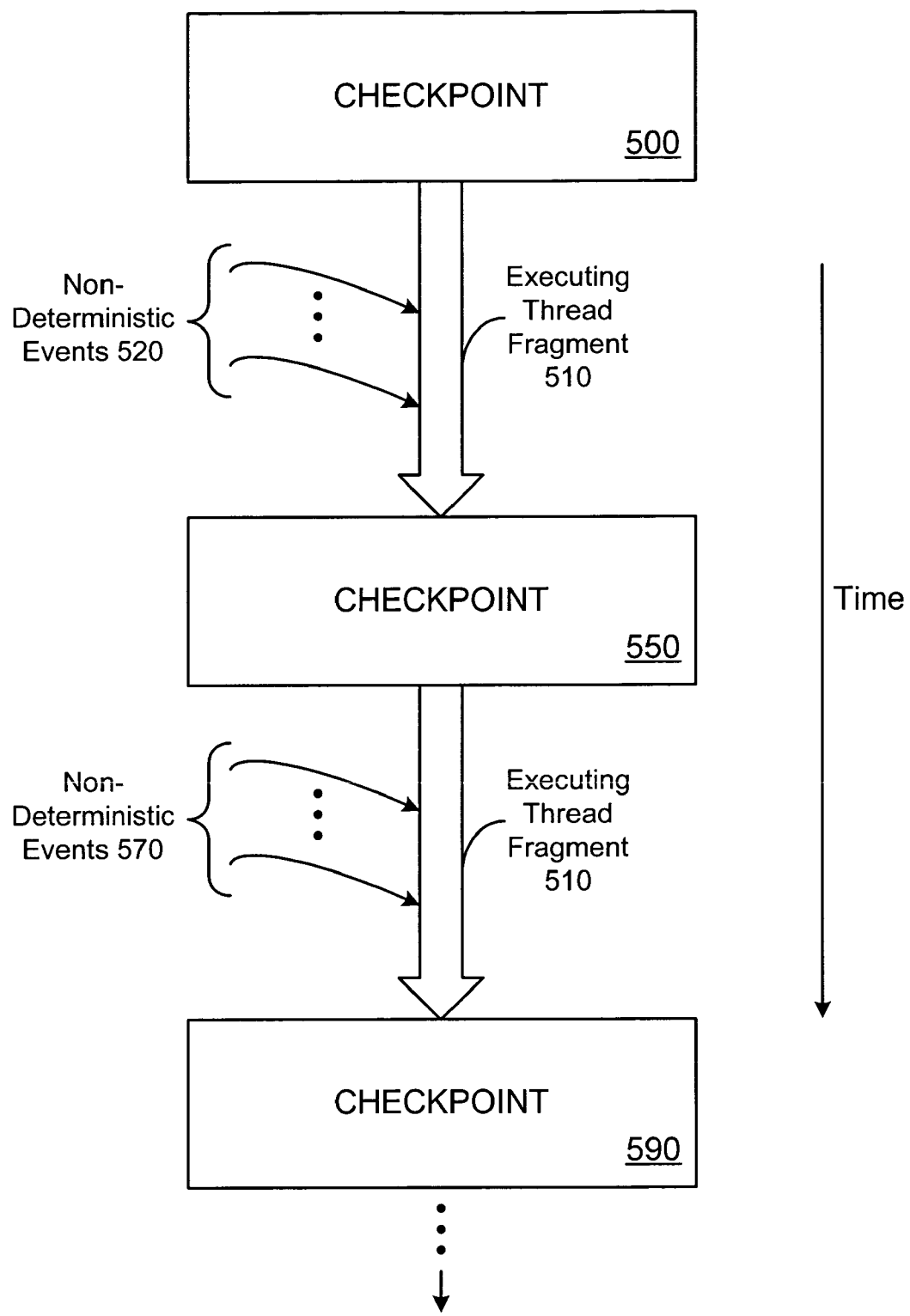
FIG. 5 is a conceptual flow of a piecewise deterministic system.

FIG. 5 is a conceptual flow of a piecewise deterministic system. Checkpoint 500 corresponds to a point in execution of a thread at which a copy of the architectural register file values is stored. In the description of FIG. 5, the instructions of a thread that are executed between checkpoints are referred to as "fragments." For example, executing thread fragment 510 represents the instructions executed between the time of checkpoint 500 and checkpoint 550 and executing thread fragment 560 represents the instructions executed between the time of checkpoint 550 and checkpoint 590.

During the time between checkpoint 500 and checkpoint 550 one or more non-deterministic events 520 occur. Non-deterministic events 520 are recorded until the time of checkpoint 550 for potential recovery purposes. During the time between checkpoint 550 and checkpoint 590 non-deterministic events 570 occur and are recorded for potential recovery purposes. At the time of checkpoint 550, the recorded non-deterministic events 520 are no longer required because checkpoint 550 corresponds to a storage of the complete architectural state at the corresponding time.

In one embodiment, the non-deterministic events are stored in a log that sequentially records the non-deterministic events. When fault recovery is required, the most recent checkpoint is restored and the non-deterministic events are re-executed to determine the correct state. As described above, a non-deterministic event is an event where execution is not determined entirely within the system (e.g., the sphere of replication to which the executing processor belongs). Non-deterministic events include, for example, load operations (e.g., memory contents modified external to the sphere of the processor), interrupts (e.g., asynchronous interrupts), or timing-dependent operations (e.g., read operations to on-chip cycle counters).

The non-deterministic events are maintained in order to provide determinism between the leading and trailing threads. When execution is deterministic, both threads follow the same execution path and capture of the non-deterministic events allows the threads to maintain consistency. Thus, the log, or record, of non-deterministic events between checkpoints can be used for error recovery.

In order to support error recovery, the checkpoint and the log of non-deterministic events must be fault free and protected against transient faults (e.g., by ECC). After completion and fault-free validation of a checkpoint, the previous checkpoint and any logged non-deterministic events prior to the current checkpoint can be discarded. Checkpoint frequency can be based on, for example, the available log storage and/or recovery latency.

As discussed above, the RMT architecture provides fault detection based on the SoR-cache architecture. When checkpoints are created the data to be stored are checked for faults. In one embodiment, all new register values from the two redundant threads are compared for a mismatch. In the absence of a mismatch, the register values can be sent to fault-protected (e.g., ECC-protected) checkpoint storage.

The log of non-deterministic events, for example, loads and asynchronous interrupts, allows the architectural state of the processor at the point a fault is detected to be reproduced starting from the last checkpoint, regardless of the time that has passed since the checkpoint. This decouples the fault detection in SoR-cache (used to verify data sent from the processor) from fault detection in SoR-register (used to validate checkpoints) because outputs (e.g., stores) can be committed externally without creating a full, validated checkpoint at the time of the output. Consequently, checkpoint validation is not in the critical path of program execution and, therefore, can be performed as a background operation. Also, checkpoints are not required for every output, which decreases the frequency of checkpoint storage.

Figure 6:
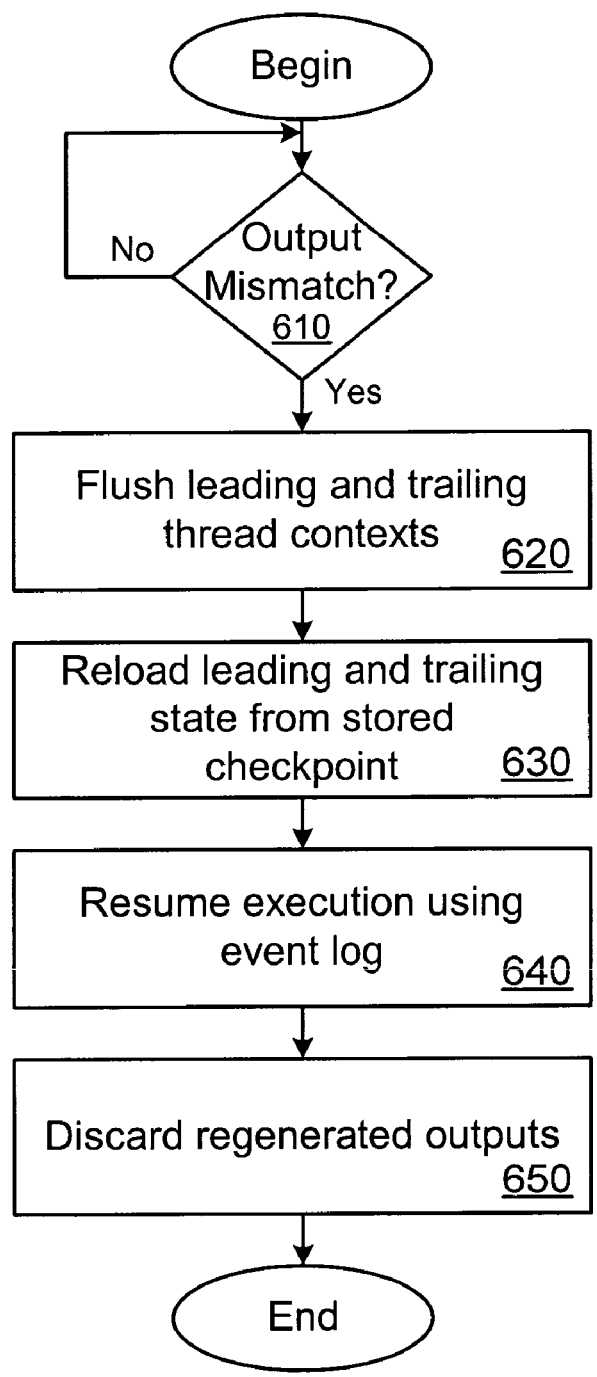
FIG. 6 is a flow diagram of one embodiment of recovery during normal operation.

FIG. 6 is a flow diagram of one embodiment of recovery during normal operation. During regular execution, outputs from the leading and trailing threads are compared to determine whether an output mismatch has occurred, 610. An output mismatch for data exiting the SoR-cache (e.g., in a store address or value) indicates the presence of a fault.

In response to the fault, both the leading and trailing thread contexts are flushed, 620, because detection of the thread does not indicate which thread caused the fault. Contexts for both threads are reloaded from the most recent checkpoint, 630. The contexts, or architectural state, corresponding to a check point can be restored from a memory that stores the most recent checkpoint.

Thread processing for both the leading and trailing thread resumes in recovery mode in which both threads are driven by the logged non-deterministic events, 640. Inputs to the trailing thread are the same for normal operation and recovery. The leading thread is temporarily supplied by the logged non-deterministic events until the execution point at which the fault occurred. In one embodiment, the fault point is determined by maintaining a counter that tracks the number of outputs generated since the previous checkpoint. During recovery, the counter is decremented for each output generated until the count reaches zero. Other techniques for determining the fault point can also be used. During recovery regenerated outputs are discarded, 650, because those outputs have already been exposed outside of the SoR-cache.

Figure 7:
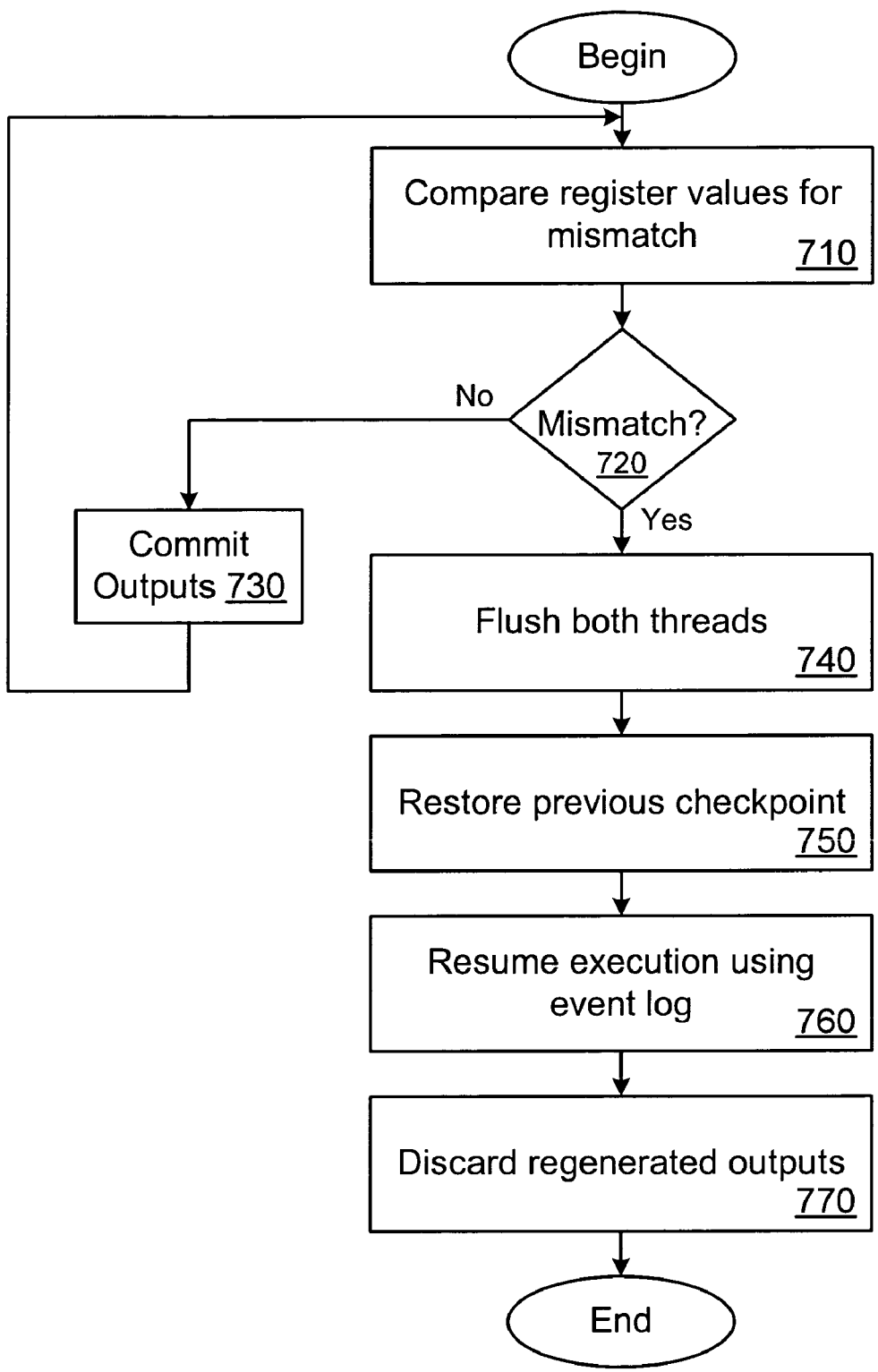
FIG. 7 is a flow diagram of one embodiment of fault recovery during checkpoint creation.

FIG. 7 is a flow diagram of one embodiment of fault recovery during checkpoint creation. Checkpoint creation may occur either continuously as a background operation or at periodic intervals. Register values from both threads are compared for mismatches, 710. In the absence of a mismatch, 720, the outputs are committed to external checkpoint storage, 730.

If a mismatch occurs, 720, both thread contexts are flushed, 740. Contexts for both threads is reloaded from the most recent checkpoint, 750. Thread processing for both the leading and trailing thread resumes in recovery mode in which both threads are driven by the logged non-deterministic events, 760. During recovery regenerated outputs are discarded, 770. The external checkpoint storage must be capable of storing a full valid checkpoint until a subsequent checkpoint can be fully validated.

Faults can also occur during the recovery procedure. In one embodiment, to detect these faults, the outputs of both threads that leave the SoR-cache are compared. In one embodiment, a detected fault during recovery can imply a permanent fault, which is flagged for action by the operating system. Alternatively, both threads can be restarted (e.g., a second time) from the checkpoint with input provided from the event log as described above.

Figure 8:
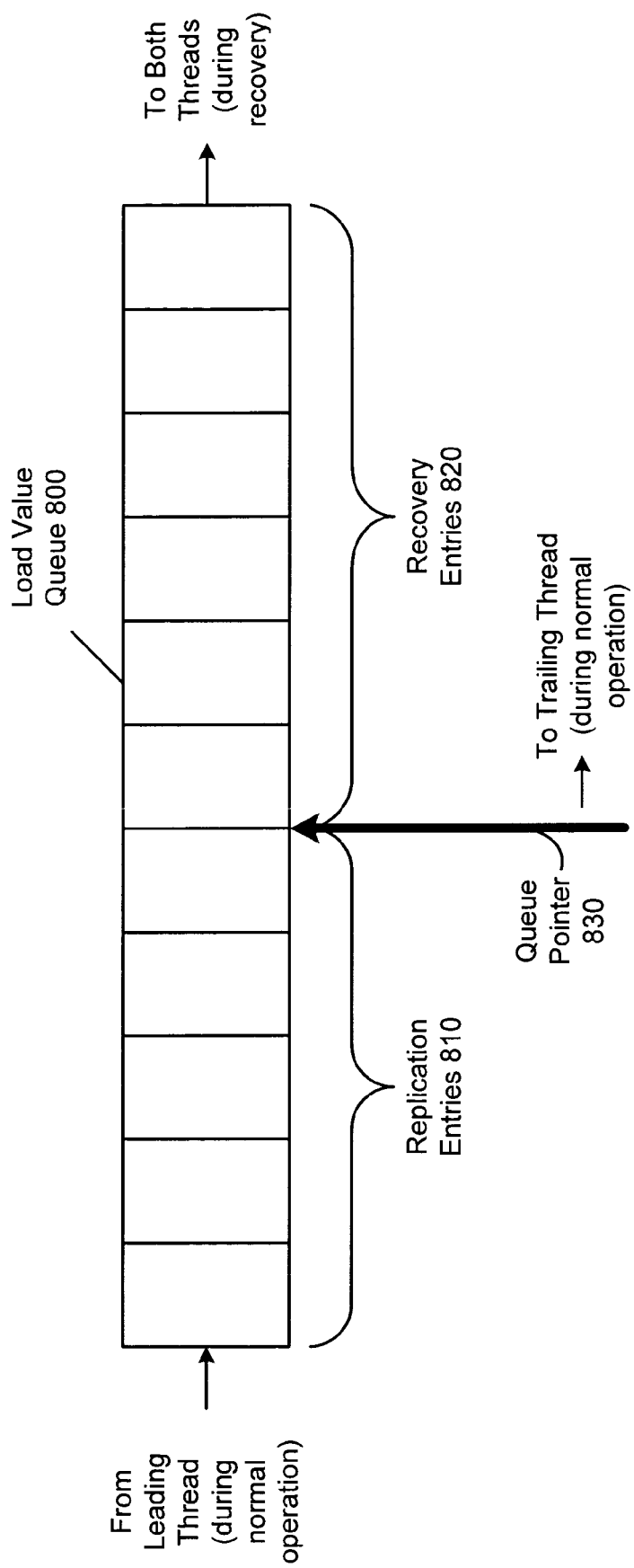
FIG. 8 is a conceptual illustration of a load value queue used for recovery.

FIG. 8 is a conceptual illustration of a load value queue used for recovery. In one embodiment, load value queue 800 is a program-order first in/first out (FIFO) queue of load values as provided to the leading thread. Loads for the trailing thread obtain values from load value queue 800 instead of from the data cache.

In order to provide for recovery, load value queue 800 maintains entries after the trailing thread has consumed the entry and until a subsequent checkpoint is completed. In one embodiment in which checkpoints are frequent, entries are stored in the same physical load value queue as used for input replication. In an alternate embodiment, a larger load value queue can be used where entries are copied from a primary load value queue to a recovery load value queue. Because the performance of recovery may not be critical, the recovery load value queue can be larger, slower and/or farther from the processor core than the replication load value queue.

Logically, the load value queue can be separated into replication entries 810 that have not been consumed by the trailing thread and recovery entries 820 that have been consumed by the trailing thread, but have not been incorporated into the latest checkpoint. Queue pointer 830 indicates the boundary between replication entries 810 and recovery entries 820.

Asynchronous interrupts can be replicated by logging the point in the instruction stream at which the interrupt is take in the leading thread and generating the interrupt at the same point in the trailing thread, or by forcing the thread copies to synchronize to the same execution point and delivering the interrupt simultaneously. In the former scenario, asynchronous interrupts can be logged and replayed in the same manner as loads. The mechanism for generating interrupts from the log can leverage the logic used to generate interrupts in the trailing thread in normal operation. In the latter scenario, interrupts are not stored and transferred between the two threads, so there is no mechanism to leverage. In this case, a more direct approach is to force a checkpoint after the threads synchronize, eliminating the need to log interrupts.

Example of a System

Figure 9:
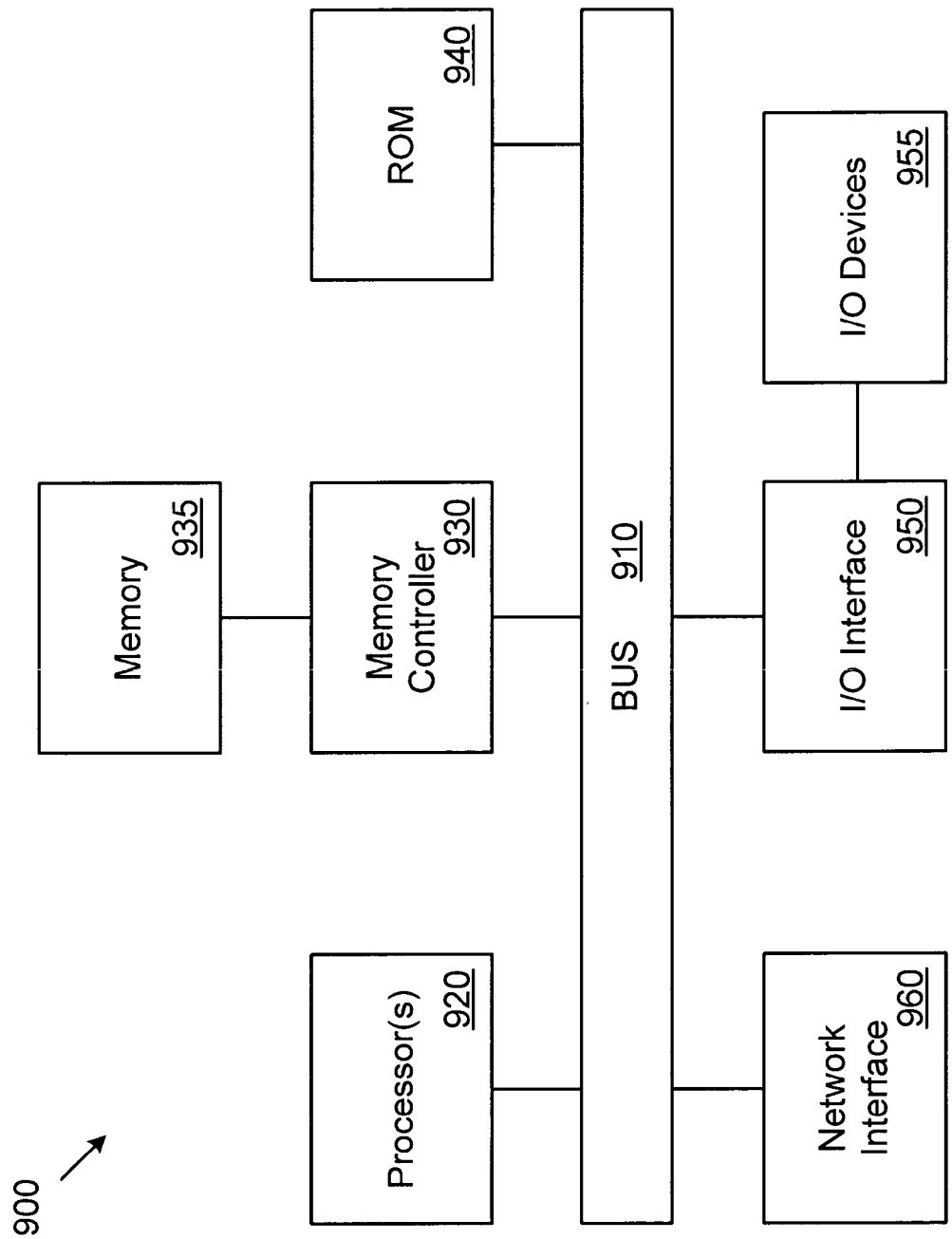
FIG. 9 is a block diagram of an electronic system that can provide an environment for multithreaded processors.

FIG. 9 is a block diagram of an electronic system that can provide an environment for multithreaded processors. The electronic system illustrated in FIG. 9 is intended to represent a range of electronic systems. Alternative electronic systems can include more, fewer and/or different components.

Electronic system 900 includes bus 910 or other communication device to communicate information, and processor(s) 920 coupled to bus 910 to process information. Electronic system 900 further includes random access memory (RAM) or other dynamic memory as well as static memory, for example, a hard disk or other storage device 935 (referred to as memory), coupled to bus 910 via memory controller 930 to store information and instructions to be executed by processor(s) 920. Memory 935 also can be used to store temporary variables or other intermediate information during execution of instructions by processor(s) 920. Memory controller 930 can include one or more components to control one or more types of memory and/or associated memory devices. Electronic system 900 also includes read only memory (ROM) and/or other static storage device 940 coupled to bus 910 to store static information and instructions for processor(s) 920.

Electronic system 900 can also be coupled via bus 910 to input/output (I/O) interface 950. I/O interface 950 provides an interface to I/O devices 955, which can include, for example, a cathode ray tube (CRT) or liquid crystal display (LCD), to display information to a computer user, an alphanumeric input device including alphanumeric and other keys and/or a cursor control device, such as a mouse, a trackball, or cursor direction keys. Electronic system 900 further includes network interface 960 to provide access to a network, such as a local area network, whether wired or wireless.

Instructions are provided to memory 935 from a storage device, such as magnetic disk, a read-only memory (ROM) integrated circuit, CD-ROM, DVD, via a remote connection (e.g., over a network via network interface 960) that is either wired or wireless, etc. In alternative embodiments, hard-wired circuitry can be used in place of or in combination with software instructions. Thus, execution of sequences of instructions is not limited to any specific combination of hardware circuitry and software instructions.

Conclusion

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   storing a register architectural state of a processor corresponding to a first checkpoint;
   storing non-deterministic memory access events as associated data that occur subsequent to the storage of the first checkpoint;
   determining whether an processing error has occurred subsequent to the storage of the first checkpoint; and
   restoring the register architectural state of the processor corresponding to the first checkpoint and re-executing the non-deterministic memory access events if a processing error is detected.

2. The method of claim 1 wherein storing the register architectural state of the processor corresponding to the first checkpoint comprises:
   synchronizing a leading thread of instructions and a trailing thread of instructions;
   checking outputs from the leading thread of instructions and the trailing thread of instructions for faults; and
   storing values from one or more architectural registers in a memory external to one or more processors executing the leading thread of instructions and the trailing thread of instructions.

3. The method of claim 2 wherein the leading thread of instructions and the trailing thread of instructions are executed by a single processor.

4. The method of claim 2 wherein the leading thread of instructions and the trailing thread of instructions are executed by multiple processors.

5. The method of claim 1 wherein restoring the register architectural state of the processor corresponding to the first checkpoint and re-executing the non-deterministic memory access events if a processing error is detected comprises:
   selectively flushing results of instructions that started execution after an instruction causing the fault started execution;
   restoring register architectural state to a checkpoint corresponding to a state at which the instruction causing the fault started execution; and
   re-executing instructions executed after the checkpoint to the instruction causing the fault using the logged non-deterministic memory access events.

6. The method of claim 5 further comprising discarding one or more outputs generated by the re-execution of the instructions executed after the checkpoint to the instruction causing the fault using the logged non-deterministic memory access events.

7. The method of claim 5 further comprising continuing execution of instructions subsequent to the instruction causing the fault.

8. The method of claim 5 wherein restoring the register architectural state to a checkpoint corresponding to a state at which the instruction causing the fault staffed execution comprises restoring the architectural state to a state prior to execution of the instruction causing the fault.

9. The method of claim 5 wherein restoring the register architectural state to a checkpoint corresponding to a state at which the instruction causing the fault staffed execution comprises restoring the register architectural state to a state a the beginning of execution of the instruction causing the fault.

10. The method of claim 1 wherein the non-deterministic memory access event comprises a load operation.

11. The method of claim 1 wherein the non-deterministic memory access event comprises an interrupt.

12. The method of claim 11 wherein the interrupt comprises an asynchronous interrupt.

13. The method of claim 1 wherein the non-deterministic memory access event comprises a timing-dependent operation.

14. The method of claim 13 wherein the timing-dependent operation comprises a read operation of a cycle counter.

15. An apparatus comprising:
   means for storing a register architectural state of a processor corresponding to a first checkpoint;
   means for storing non-deterministic memory access events as associated data that occur subsequent to the storage of the first checkpoint;
   means for determining whether an processing error has occurred subsequent to the storage of the first checkpoint; and
   means for restoring the register architectural state of the processor corresponding to the first checkpoint and re-executing the non-deterministic memory access events if a processing error is detected.

16. The apparatus of claim 15 wherein the means for restoring the register architectural state of the processor corresponding to the first checkpoint and re-executing the non-deterministic memory access events if a processing error is detected comprises:
   means for selectively flushing results of instructions that started execution after an instruction causing the fault started execution;
   means for restoring the register architectural state to a checkpoint corresponding to a state at which the instruction causing the fault started execution; and
   means for re-executing instructions executed after the checkpoint to the instruction causing the fault using the logged non-deterministic events.

17. The apparatus of claim 15 further comprising means for discarding one or more outputs generated by the re-execution of the instructions executed after the checkpoint to the instruction causing the fault using the logged non-deterministic memory access events.

18. An apparatus comprising:
   leading thread execution circuitry to execute a leading thread of instructions;
   trailing thread execution circuitry to execute a trailing thread of instructions; and
   a memory coupled with the leading thread execution circuitry and the trailing thread execution circuitry to store information related to non-deterministic memory access events, wherein the information related to non-deterministic memory access events is stored at least until a subsequent checkpoint having an associated register architectural state is validated.

19. The apparatus of claim 18 wherein the memory stores a load value queue that stores replication entries corresponding to load operations executed by the leading thread execution circuitry and not executed by the trailing thread execution circuitry, and further wherein the load value queue stores recovery entries corresponding to load operations executed by the leading thread execution circuitry and by the trailing thread execution circuitry and not incorporated into information corresponding to a checkpoint.

20. The apparatus of claim 19 wherein the load value queue further stores information corresponding to one or more of an interrupt and a timing-dependent operation.

21. The apparatus of claim 18 wherein the memory stores a first load value queue that stores replication entries corresponding to load operations executed by the leading thread execution circuitry and not executed by the trailing thread execution circuitry, and a second load value queue stores recovery entries corresponding to load operations executed by the leading thread execution circuitry and by the trailing thread execution circuitry and not incorporated into information corresponding to a checkpoint.

22. The apparatus of claim 21 wherein the first load value queue and the second load value queue further store information corresponding to one or more of an interrupt and a timing-dependent operation.

23. A system comprising:
leading thread execution circuitry to execute a leading thread of instructions;
trailing thread execution circuitry to execute a trailing thread of instructions;
a memory controller coupled with the leading thread execution circuitry; and
a memory coupled with the leading thread execution circuitry and the trailing thread execution circuitry to store information related to non-deterministic memory access events, wherein the memory controller causes the memory to store a register architectural state of a processor corresponding to a first checkpoint and non-deterministic memory access events as associated data that occur subsequent to the storage of the first checkpoint, the memory controller determines whether an processing error has occurred subsequent to the storage of the first checkpoint, and, in response to the processing error, the memory controller restores the register architectural state of the processor corresponding to the first checkpoint and re-executes the non-deterministic memory access events.

24. The system of claim 23 wherein the memory stores a load value queue that stores replication entries corresponding to load operations executed by the leading thread execution circuitry and not executed by the trailing thread execution circuitry, and further wherein the load value queue stores recovery entries corresponding to load operations executed by the leading thread execution circuitry and by the trailing thread execution circuitry and not incorporated into information corresponding to a checkpoint.

25. The system of claim 24 wherein the load value queue further stores information corresponding to one or more of an interrupt and a timing-dependent operation.

26. The system of claim 23 wherein the memory stores a first load value queue that stores replication entries corresponding to load operations executed by the leading thread execution circuitry and not executed by the trailing thread execution circuitry, and a second load value queue stores recovery entries corresponding to load operations executed by the leading thread execution circuitry and by the trailing thread execution circuitry and not incorporated into information corresponding to a checkpoint.

27. The system of claim 26 wherein the first load value queue and the second load value queue further store information corresponding to one or more of an interrupt and a timing-dependent operation.

* * * * *